United States Patent [19]

Onoue et al.

[11] Patent Number: 4,853,603
[45] Date of Patent: Aug. 1, 1989

[54] CONTROL OF AN INDUSTRIAL ROBOT

[75] Inventors: Kazuhiko Onoue, Nishinomiya; Hajime Kashiki, Kobe, both of Japan

[73] Assignee: Kawasaki Jukogyo Kabushiki Kaisha, Japan

[21] Appl. No.: 169,018

[22] Filed: Mar. 16, 1988

[30] Foreign Application Priority Data

Mar. 19, 1987 [JP] Japan .................. 62-66863

[51] Int. Cl.$^4$ ............................................. G05B 19/42
[52] U.S. Cl. .................. 318/568.15; 318/572; 318/632; 318/569; 901/40; 364/513
[58] Field of Search .................. 318/560–574, 318/632; 364/513; 901/20–38, 40

[56] References Cited

U.S. PATENT DOCUMENTS

| | | | |
|---|---|---|---|
| 4,287,459 | 9/1981 | Dahlstrom | 901/40 X |
| 4,497,029 | 1/1985 | Kiyokawa | 318/632 X |
| 4,543,636 | 9/1985 | Noda et al. | 318/569 X |
| 4,575,802 | 3/1986 | Walsh et al. | 318/632 X |
| 4,590,578 | 5/1986 | Barto, Jr. et al. | 318/632 X |
| 4,591,771 | 5/1986 | Nozawa et al. | 318/632 X |
| 4,613,943 | 4/1986 | Miyake et al. | 318/568 X |
| 4,680,519 | 7/1987 | Chand et al. | 318/568 |
| 4,700,118 | 10/1987 | Kishi et al. | 318/568 |
| 4,706,000 | 11/1987 | Kishi et al. | 318/632 X |
| 4,771,222 | 9/1988 | Nakashima et al. | 318/572 |
| 4,776,247 | 10/1988 | Kiya | 318/572 X |

Primary Examiner—William M. Shoop, Jr.
Assistant Examiner—Paul Ip
Attorney, Agent, or Firm—Stevens, Davis, Miller & Mosher

[57] ABSTRACT

A method for controlling a working robot which is adapted to grip a workpiece for transporting it to a position where the workpiece is positioned against a working tool to be worked by the tool. The robot is positioned at a work starting position and at a work end position and in each of the positions the tool length vector is calculated. Based on the tool length vector values in the starting and end positions, intermediate tool length vector values are calculated for respective incremental points on a path along which the work is to be done by the tool for carrying out incremental compensations.

5 Claims, 5 Drawing Sheets

CONTROL OF AN INDUSTRIAL ROBOT

BACKGROUND OF THE INVENTION

1. Field of the Invention

The present invention relates to a control of an industrial robot and more particularly to a control of a working robot which holds a work to bring it against a tool to be worked by the tool.

2. Description of the Prior Art

Known industrial robot technology includes a working robot which is adapted to hold a workpiece and bring it to a position where it is placed against a tool to be worked by the tool. The tool may be of any kind, such as a torch of an arc welding equipment, a spray nozzle of a painting equipment or a spray nozzle of a sealant applying equipment. The robot includes an arm mechanism having a hand which can be moved about a plurality of axes. The workpiece is gripped by the hand and moved with respect to the tool so that the tool traces a predetermined path on the workpiece. Prior to the actual work being performed, a teaching is made so that the robot is located against the tool at predetermined positions and predetermined orientations in a plurality of teaching points on the predetermined path.

The robot must be controlled so that the workpiece can be moved with respect to the tool smoothly from the predetermined position and the predetermined orientation at one teaching point to those at another teaching point. For the purpose, an incremental compensation control is made between each two adjacent teaching points. The position of the tool with respect to the workpiece can be represented in terms of the distance between a point on the robot hand and the working end of the tool as measured in the direction of the axis of the tool and the distance is generally referred as the "tool length". The orientation of the tool with respect to the workpiece can be represented in terms of the direction of the axis of the tool and the tool length having the directionality along the axis of the tool may be referred as the "tool length vector". Conventionally, the control unit for the robot has a memory storing a plurality of different values for the tool length vector and closest ones are selectively used at each teaching point, the compensation control being carried out depending on the selected values of the tool length vector in each teaching point.

According to the conventional manner of compensation control, deviations are always produced from desired values in respect of the tool length vector at any point between each two adjacent teaching points. In order to make the deviations as small as possible, it is necessary to increase the number of values to be stored in the memory. Alternatively, the number of the teaching points may be increased so that the distance between each two adjacent teaching points can be decreased. However, either of the solutions are not preferable because it requires increased labor and time for the teaching.

SUMMARY OF THE INVENTION

It is therefore an object of the present invention to provide a method for controlling a robot which can determine the tool length in a precise manner.

Another object of the present invention is to provide a method for controlling a robot in which the teaching procedure can be simplified.

A further object of the present invention is to provide a working robot which is adapted to hold a workpiece and move it against a tool which is held in a stationary position so that the workpiece is traced by the tool along a predetermined path with desired tool length and position vector.

According to the present invention, the above and other objects can be accomplished by a method for controlling a working robot which has hand means adapted to hold a workpiece and move it with respect to a tool which is held in a stationary position so that a work is performed by the tool on the workpiece at a predetermined location, the method comprising steps of obtaining a position of a working end of said tool in first coordinates taken in said robot, operating said hand means to bring said workpiece to a first position wherein a first point on the workpiece is located with respect to said tool so that a desired work can be done by the tool on said first point and obtaining a first tool length vector in the first position in second coordinates having an origin in a point on said hand means, operating said hand means to bring said workpiece to a second position wherein a second point is located with respect to said tool so that a desired work can be done by the tool on said second point and obtaining a second tool length vector in the second position in said second coordinates, calculating a work distance on said workpiece along a path on which a work is to be performed, calculating based on said first and second tool length vectors and said work distance an intermediate tool length vector at an intermediate point on said path between said first and second points as a value in said second coordinates, converting said value of the intermediate tool length vector into a corresponding value on said first coordinates, and controlling said hand means in accordance with said corresponding value on said first coordinates.

According to the features of the present invention, the tool length vector values are obtained in the second coordinates at the first and second points so that the difference in the tool length vector values between the first and second points can readily be calculated and the difference can be divided into increments for calculating the tool length vector values for incremental points along the path on the workpiece. The values are then converted into corresponding values on the first coordinates so that the robot hand means can be controlled to move the workpiece smoothly from the starting point to the end point. The present invention is advantageous in that the tool length vector values for the incremental points along the path on the workpiece can be precisely determined.

The above and other objects and features of the present invention will become apparent from the following descriptions of a preferred embodiment taking reference to the accompanying drawings.

DESCRIPTION OF THE PREFERRED EMBODIMENT

Figure 1:
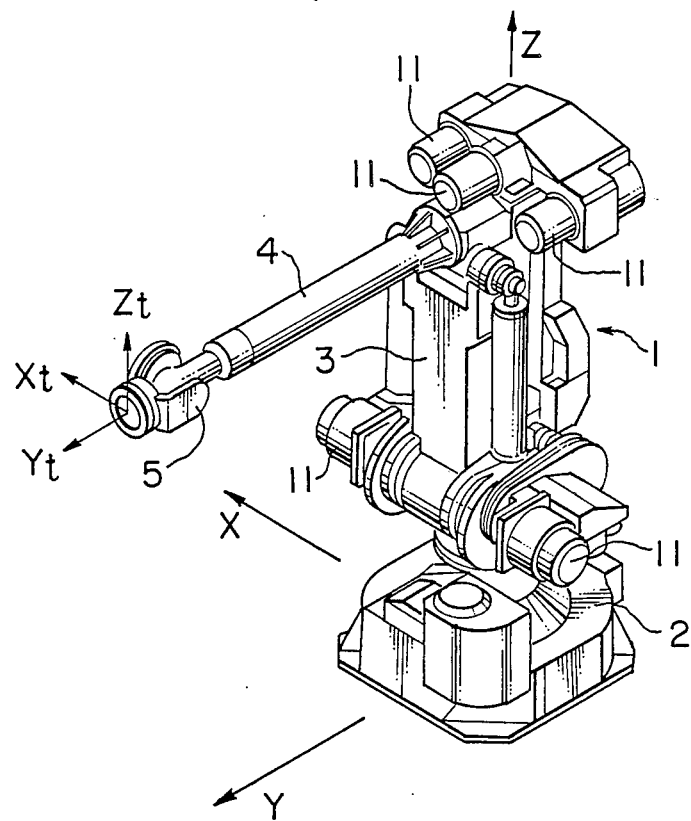
FIG. 1 is a perspective view of a working robot to which the present invention can be applied.
Figure 2:
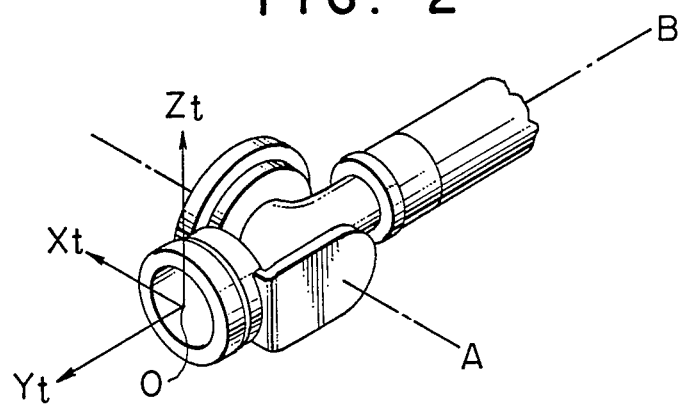
FIG. 2 is a perspective view showing the coordinates taken on the robot hand.
Figure 3:
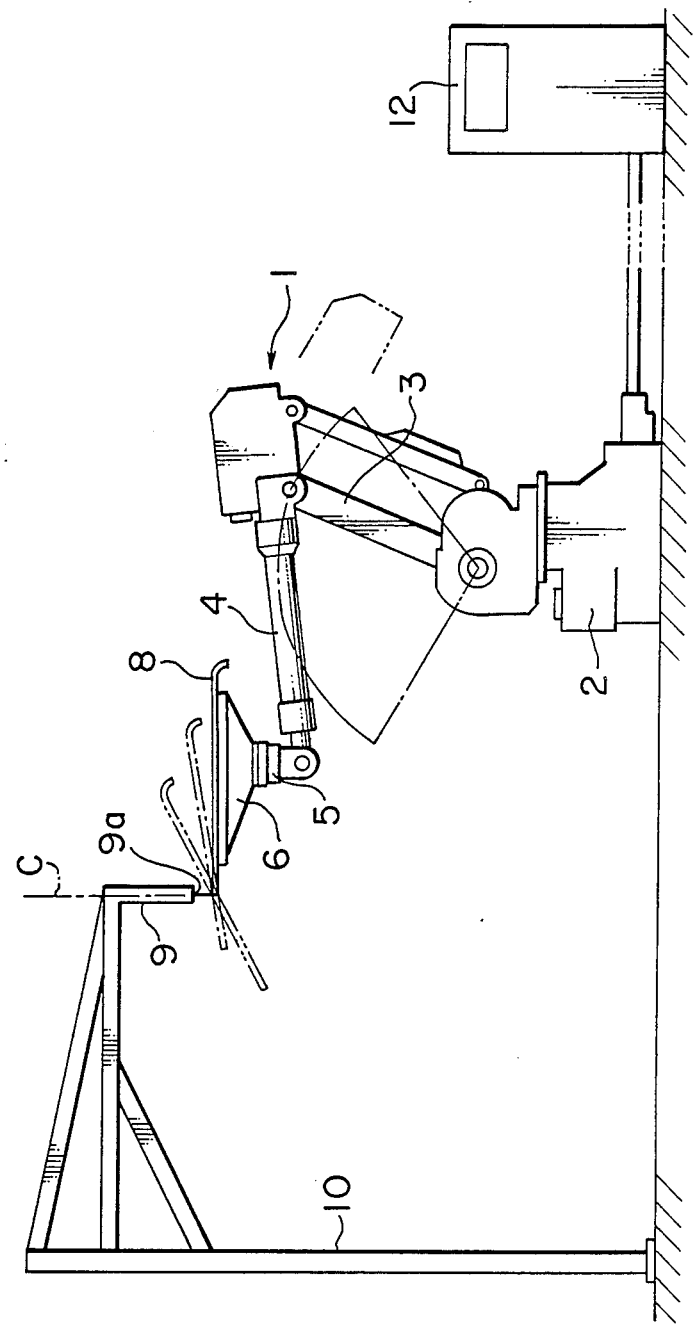
FIG. 3 is a diagrammatical side view of the robot showing one mode of operation.
Figure 6:
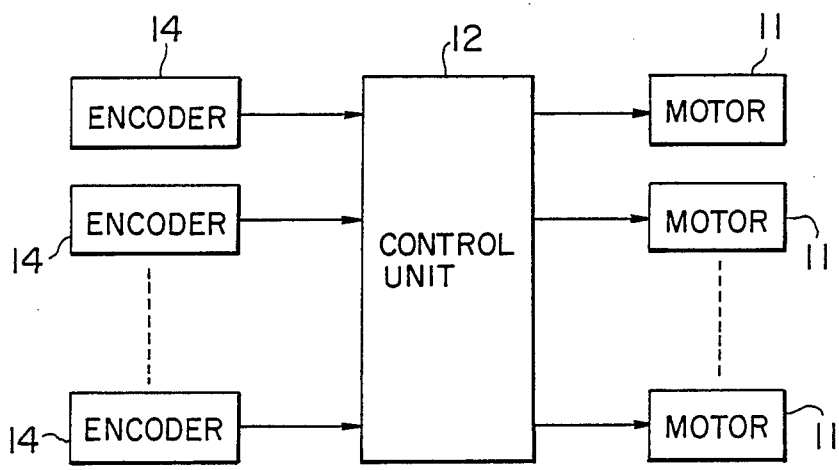
FIG. 6 is a block diagram showing the control system.

Referring to the drawings, particularly to FIG. 1, there is shown a working robot 1 to which the present invention can be applied. As shown, the robot 1 includes a base 2 on which a swingable frame 3 is mounted. The swingable frame 3 carries an arm 4 which is provided at an end with a hand 5. Coordinates having perpendicularly intersecting axes X, Y and Z are taken as having an origin at a point on the base 2 of the robot 1. The swingable frame 3 is swingable about a horizontal axis which parallel with the X-axis. As shown in FIG. 3, the swingable frame 3 is in the form of a parallelogram and the arm 4 is mounted on the top end portion of the parallelogram of the swingable frame 3 so that the frame can be swingably moved without changing the orientation of the arm 4. The arm 4 is swingable about an axis parallel with the Z-axis and also about an axis parallel with the X-axis. The hand is mounted on the tip end portion of the arm 4 so that it is swingable about a horizontal axis A perpendicular to the longitudinal axis B of the arm 4 as shown in FIG. 2. Further, the hand 5 is rotatable about the longitudinal axis B of the arm 4. Encoders 14 shown in FIG. 6 are provided to detect the positions of the swingable frame 3, the arm 4 and the hand 5. The robot 1 is provided with a plurality of motors 11 for appropriately operating the swingable frame 3, the arm 4 and the hand 5. In FIG. 6, it will be noted that the encoders 14 are connected with the control unit 12 to apply signals representing the positions of the swingable frame 3, the arm 4 and the hand 5. The control unit produces signals which are applied to the motors 11 to operate the robot 1 so that the workpiece 8 is appropriately positioned with respect to the tool 9.

Referring to FIG. 3, it will be noted that the hand 5 has a workpiece gripper 6 which may be of a known structure and is mounted on the hand 5. The workpiece gripper 6 grips a workpiece 8 which may be a sheet metal part to be painted. A working tool 9 which may be a paint spraying nozzle is mounted stationary on a tool stand 10 and has an axis C oriented in a predetermined direction.

In the example shown in FIG. 3, the workpiece 8 is of a substantially flat configuration having an edge portion which is bent with respect to the main part of the workpiece 8. The workpiece 8 is shown by solid lines in a position where the work starting point on the workpiece 8 is located against the work end 9a of the tool 9. In this position, the axis C of the tool 9 is oriented with respect to the workpiece 8 substantially perpendicularly so that a desired work can be done by the tool 9. In the work end position, the tool 9 is located so that it is placed against the bent edge portion of the workpiece 8 and it is preferable that the axis 9a of the tool 9 is oriented substantially perpendicularly to the surface of the bent portion of the workpiece 8. It will therefore be understood that the robot 1 must be operated so that the workpiece 8 is moved smoothly from the orientation at the work starting position to the orientation at the work end position passing the positions as shown by dotted lines in FIG. 3. A control unit 12 is provided to control the operation of the robot 1.

Figure 4:
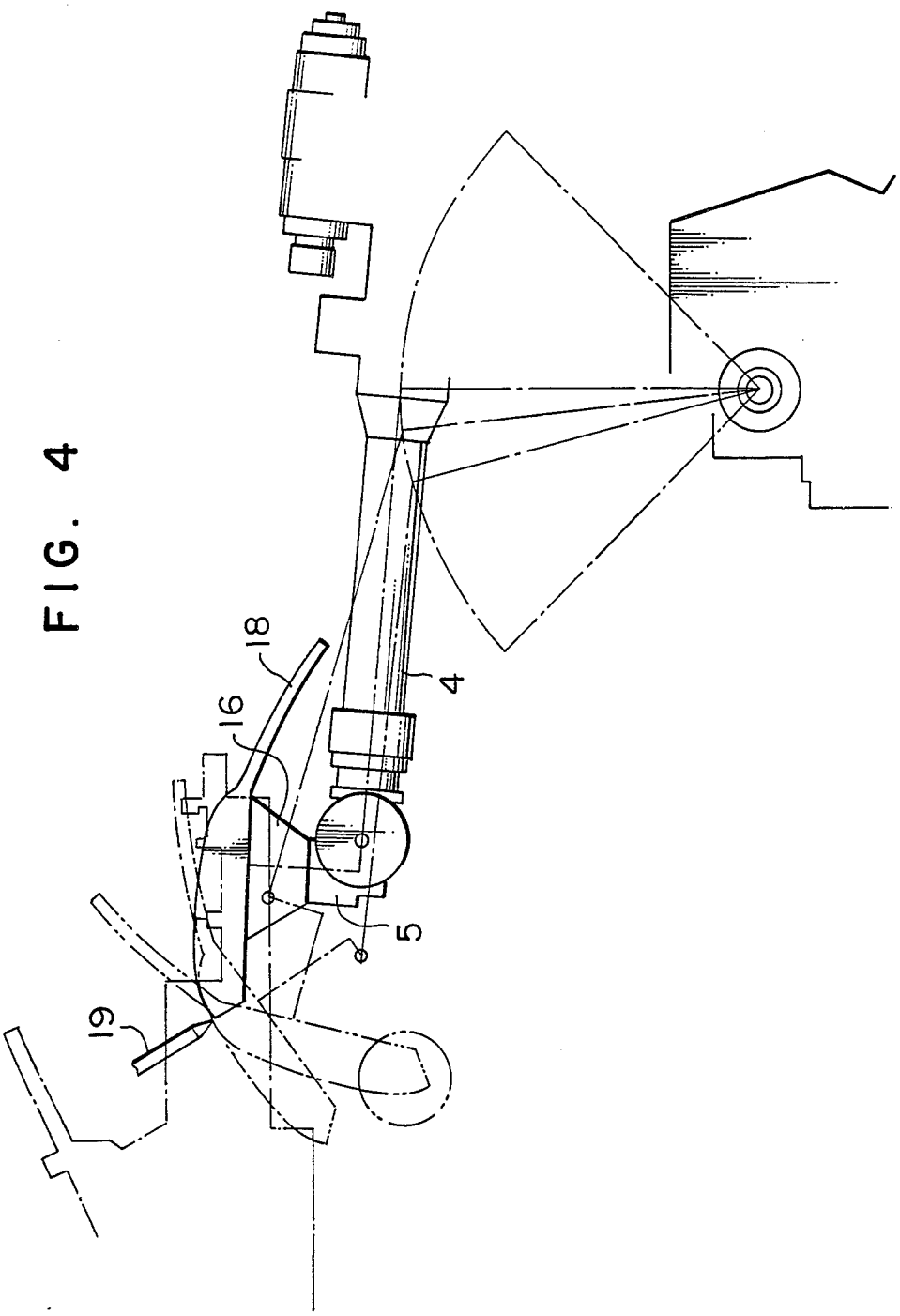
FIG. 4 is a side view similar to FIG. 3 but showing another mode of operation.

FIG. 4 shows another example of the robot control in accordance with the present invention. The hand 5 of the robot is provided with a workpiece gripper 16 which holds a workpiece 18. A tool 19 is provided in a fixed position and oriented in a predetermined direction. In this example, the workpiece 18 is moved by the robot from the work starting position as shown by solid lines through intermediate positions shown by broken lines to the work end position which is not shown in FIG. 4.

Figure 5:
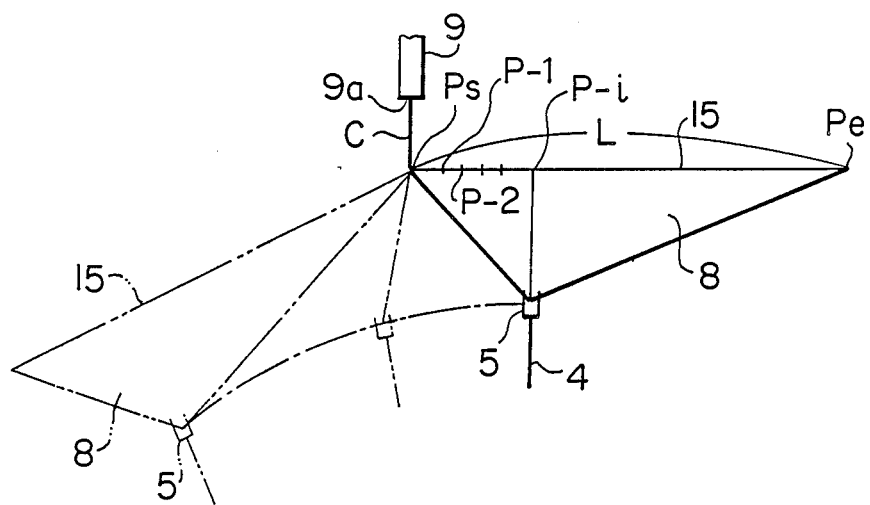
FIG. 5 is a diagrammatical view showing the relationship between the tool and the workpiece.

Referring now to FIG. 5, there is shown by solid lines the aforementioned workpiece 8 in the work starting position. In this position, the work starting point Ps on the workpiece 8 is located on the extension of the axis C or the tool 9. As shown in FIG. 2, coordinates having perpendicularly intersecting axes Xt, Yt and Zt are taken as having the origin O at the center of the tip end of the hand 5. In the example illustrated in FIG. 2, the axes Xt and Zt are on the plane containing the tip end surface of the hand 5. The axis Yt is coaxial with the axis of the hand 5. The working end 9a of the tool 9 is located with respect to the robot 1 to have predetermined coordinate values T(X, Y, Z) in the first mentioned coordinates on the robot 1.

In the work starting position shown by the solid lines in FIG. 5, the position of the robot hand 5 is calculated from the signals produced by the encoders 14. The encoder signals may be those representing angular positions at the respective axes about which the swingable frame 3, the arm 4 and the hand 5 are respectively movable. In case where the robot 1 has six axes, the encoders 14 produce six angular signals a-1 through a-6. Based on the angular signals a-1 through a-6, it is possible to calculate the position and the orientation of the hand 5.

Generally, the position and the orientation of the robot hand 5 can be represented in the form of a matrix T. For example, the matrix Ts at the work starting position can be written as follows:

$$Ts = \begin{pmatrix} a_{11} & a_{12} & a_{13} & x \\ a_{21} & a_{22} & a_{23} & y \\ a_{31} & a_{32} & a_{33} & z \\ 0 & 0 & 0 & 1 \end{pmatrix}$$

Then, the robot 1 is operated to bring the workpiece 8 to the work end position shown by broken lines in FIG. 5. In this position, the work end point Pe is located on the extension of the axis C of the tool 9. As in the work starting position, the position and the orientation of the hand 5 are calculated based on the signals a-1 through a-6 produced by the encoders 14.

The workpiece 8 has a path 15 along which a work is to be done by the tool 9. The path 15 has a length L which can be calculated based on the encoder signals a-1 through a-6 at the work starting position and the work end position. In order for performing the incremental compensation, the path 15 is divided into a plurality of incremental portions by incremental points P-1, P-2, . . . P-i. The differences between the position and the orientation of the hand at the work starting position and those at the work end position are calculated and divided into increments to obtain values respectively corresponding to the incremental points P-1, P-2, ... P-i. Based on the values thus obtained, the positions and the orientations of the hand 5 at the respective incremental points P-1, P-2, ... P-i are calculated.

Based on the informations representing the position and the orientation of the tool 9 in the robot coordinates X, Y and Z, and the informations representing the position and the orientation of the robot hand 5 at the work starting position, it is possible to calculate the tool distance vector ts in the coordinates (Xt, Yt, Zt) at the work starting position. The calculation formula for the tool distance vector ts is represented as follows:

$$ts = Ts^{-1}(X_{tool} - X_{hs}) \tag{1}$$

where $X_{tool}$ represents the coordinates value of the tool work end 9a in the coordinates (X, Y, Z) and $X_{hs}$ represents the coordinates value of the robot hand 5 in the coordinates (X, Y, Z) at the work starting position. $Ts^{-1}$ represents the conversion of the matrix representing the position and the orientation at the work starting position from the coordinates (X, Y, Z) to the coordinates (Xt, Yt, Zt).

Similarly, the tool distance vector te at the work end position is calculated as the value in the coordinates (Xt, Yt, Zt) from the following formula:

$$te = Te^{-1}(X_{tool} - X_{he}) \tag{2}$$

Then, the tool length vector ti at each incremental point P-i is calculated by the following formula:

$$= (te - ts) \times 1/L + ts \tag{3}$$

where ti is the distance between the work starting point Ps and the point P-i along the path 15.

Thereafter, the position and the orientation of the robot hand 5 at the incremental point P-i is calculated as the value Xi in the coordinates (X, Y, Z) by the following formula:

$$\begin{aligned} Xi &= X_{tool} - Ti \times ti \\ &= X_{tool} - Ti \times (te - ts) \times 1/L + Ti \times ts \end{aligned} \tag{4}$$

Based on the coordinates value Xi, the angular value corresponding to the position and the orientation of the hand 5 at each incremental point P-i is calculated for each axis of the robot 1. The formula for calculating the angular value can be represented as follows:

$$ai = f^{-1}(Xi, Ti) \tag{5}$$

The angular value for each axis of the robot 1 is given to the driving motor 11 as the motor driving signal to move the robot hand 5 to a desired position at each incremental point P-i.

Figure 7:
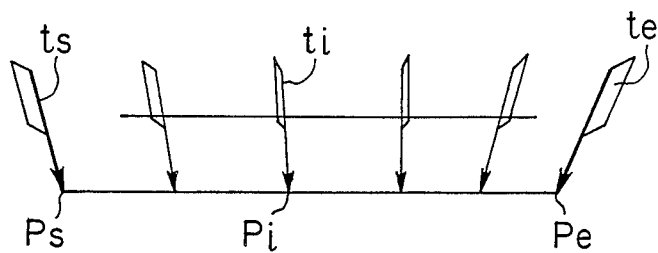
FIG. 7 is a diagrammatical illustration of the incremental points and the tool length vectors on the points.

FIG. 7 shows the incremental change in the tool length vector. Through the control of the robot hand 5 as described above, it is possible to change the tool length vector in a gradual manner as shown.

Figure 8:
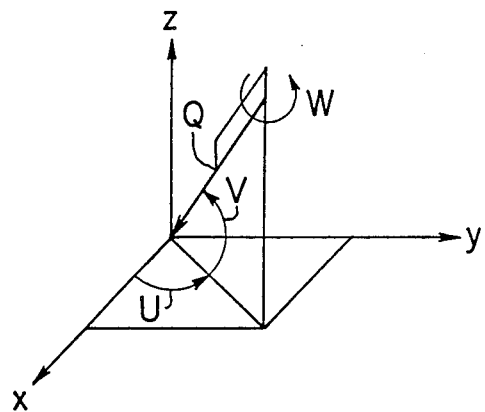
FIG. 8 is a diagram showing the angles for designating the tool length vector; and, FIG. 9 is a diagrammatical illustration of another example of the control in accordance with the present invention.

FIG. 8 shows one example of the incremental compensation. The arrow Q may represent the robot hand 5 which is oriented with respect to the coordinates (X, Y, Z) with angles U, V, W as shown. The angles at the work starting position are designated as Us, Vs and Ws, respectively, and the angles at the work end position are designated as Ue, Ve and We, respectively. Differences between the angle values at the work starting position and those at the work end position are then proportionally divided for the respective incremental portions on the path 15 and the angle values for each incremental point P-i are calculated based on the divided values.

Figure 9:
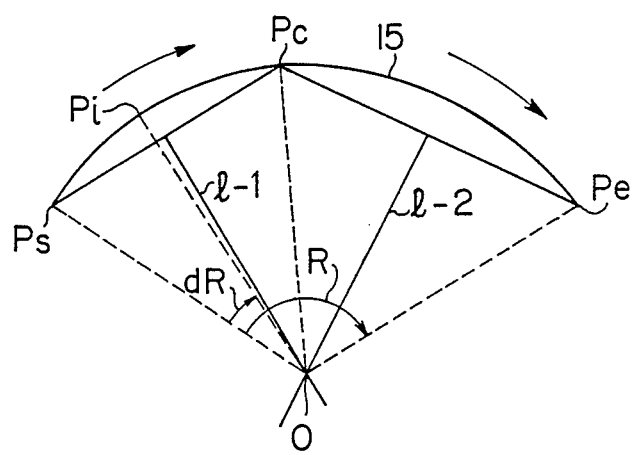

In the example shown in FIG. 5, the path on the workpiece 8 is in the form of a straight line. FIG. 9 shows another example wherein the workpiece 8 has a part circular path 15. In this example, an intermediate point Pc is taken between the starting point Ps and end point Pe. The, the center O of the circle of the path 15 is obtained as the point of intersection of the bisector line 1-1 of a straight line between the points Ps and Pc with the bisector line 1-2 of a straight line between the points Pc and Pe. The angle R can be used in lieu of the distance L in the previously described example and the angle dR can be used for designating the position of the point Pi for the incremental compensation.

The invention has thus been shown and described with reference to a specific embodiment, however, it should be noted that the invention is in no way limited to the details of the examples as described but changes and modifications may be made without departing from the scope of the appended claims.

We claim:

1. A method for controlling a working robot which has hand means adapted to hold a workpiece and move it with respect to a tool which is held in a stationary position so that a work is performed by the tool on the workpiece at a predetermined location, the method comprising steps of obtaining a position of a working end of said tool in first coordinates taken in said robot, operating said hand means to bring said workpiece to a first position wherein a first point on the workpiece is located with respect to said tool so that a desired work can be done by the tool on said first point and obtaining a first tool length vector in the first position in second coordinates having an origin in a point on said hand means, operating said hand means to bring said workpiece to a second position wherein a second point is located with respect to said tool so that a desired work can be done by the tool on said second point and obtaining a second tool length vector in the second position in said second coordinates, calculating a work distance on said workpiece along a path on which a work is to be performed, calculating based on said first and second tool length vectors and said work distance an intermediate tool length vector at an intermediate point on said path between said first and second points as a value in said second coordinates, converting said value of the intermediate tool length vector into a corresponding value on said first coordinates, and controlling said hand means in accordance with said corresponding value on said first coordinates.

2. A method for controlling a working robot in accordance with claim 1 in which said first point is a work starting point and said second point is a work end point.

3. A method for controlling a working robot in accordance with claim 1 in which said path is divided into a plurality of incremental portions by incremental points, said intermediate tool length vector is calculated for each incremental point.

4. A method for controlling a working robot in accordance with claim 3 in which a calculation is made to obtain a difference between said first tool length vector and said second tool length vector, said difference being divided into incremental parts corresponding to said incremental portions of said path, said intermediate tool length vector being calculated based on said incremental parts of said difference between the first and second tool length vectors.

5. A method for controlling a working robot in accordance with claim 4 in which said difference between the first and second tool length vectors is proportionally divided depending on a distance from the first point.

* * * * *